(12) United States Patent
Nakazato (10) Patent No.: US 9,623,792 B2
(45) Date of Patent: Apr. 18, 2017

(54) VEHICLE HEADLIGHT

(71) Applicant: Stanley Electric Co., Ltd., Tokyo (JP)

(72) Inventor: Yoshiaki Nakazato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 10 days.

(21) Appl. No.: 14/959,540

(22) Filed: Dec. 4, 2015

(65) Prior Publication Data

US 2016/0159273 A1    Jun. 9, 2016

(30) Foreign Application Priority Data

Dec. 8, 2014   (JP) ................................ 2014-248213

(51) Int. Cl.
| | | |
|---|---|---|
| H05B 33/08 | (2006.01) | |
| B60Q 1/14 | (2006.01) | |
| F21S 8/10 | (2006.01) | |
| F21Y 115/30 | (2016.01) | |

(52) U.S. Cl.
CPC ........ B60Q 1/1423 (2013.01); F21S 48/1145 (2013.01); F21S 48/1225 (2013.01); F21S 48/1241 (2013.01); F21S 48/1747 (2013.01); *B60Q 2300/112* (2013.01); *B60Q 2400/30* (2013.01); *F21S 48/1154* (2013.01); *F21Y 2115/30* (2016.08)

(58) Field of Classification Search
USPC ... 315/77, 82, 83, 88, 89, 90, 119, 121, 122, 315/123, 185 R, 192, 193, 291, 294, 297, 315/307, 312, 313, 362
See application file for complete search history.

(56) References Cited

U.S. PATENT DOCUMENTS

| | | | |
|---|---|---|---|
| 7,427,151 B2* | 9/2008 | Okubo ..................... | B60Q 1/12 362/44 |
| 2005/0275562 A1* | 12/2005 | Watanabe .............. | B60Q 1/085 340/933 |
| 2009/0231866 A1 | 9/2009 | Yamamura | |
| 2014/0211449 A1 | 7/2014 | Nomura et al. | |

FOREIGN PATENT DOCUMENTS

| | | |
|---|---|---|
| EP | 2 567 867 A2 | 3/2013 |
| JP | 2009-184642 A | 8/2009 |
| JP | 2009-218155 A | 9/2009 |
| JP | 2013-54993 A | 3/2013 |
| JP | 2014-146750 A | 8/2014 |

* cited by examiner

*Primary Examiner* — Douglas W Owens
*Assistant Examiner* — Jianzi Chen
(74) *Attorney, Agent, or Firm* — Kenealy Vaidya LLP (57) ABSTRACT

A vehicle headlight can ensure a driver's visibility even when the headlight projects low-beam, and at the same time, can promote awareness of pedestrians and the like in front of and around the vehicle. A vehicle headlight installed in a vehicle can include a plurality of lamp modules each configured to project light in front of the vehicle, and a control unit configured to control the plurality of lamp modules to be turned on and off so that a lighting pattern constituted by the lamp module or lamp modules being turned on is varied and at least one lamp module out of the plurality of lamp modules is configured to form a predetermined light distribution for ensuring a driver's visibility when being turned on.

20 Claims, 6 Drawing Sheets

VEHICLE HEADLIGHT

This application claims the priority benefit under 35 U.S.C. §119 of Japanese Patent Application No. 2014-248213 filed on Dec. 8, 2014, which is hereby incorporated in its entirety by reference.

TECHNICAL FIELD

The presently disclosed subject matter relates to a vehicle headlight.

BACKGROUND ART

General automobiles utilize various types of lighting fixtures for causing pedestrians to perceive the presence of automobiles, such as a daytime running light (DRL), a turn signal lamp, a tail end lamp, a stop lamp, etc.

A light emitting module for use in a vehicle headlight is proposed in Japanese Patent Application Laid-Open No. 2014-146750 (or US2014/0211449A1 corresponding this Japanese publication) as a lighting fixture (such as DRL) other than the main headlamp. The light emitting module can include a plurality of light emitting elements linearly arranged, and a light guiding body layer configured to guide light emitted from the light emitting element when turned on. Further included is a fluorescent substance resin layer containing a fluorescent substance and covering the light guiding body layer on or in which the light emitting elements are provided.

With this configuration, when the light emitting elements are turned on, the emitted light can enter the light guiding body layer and also enter the fluorescent substance resin layer directly and indirectly via the light guiding body layer. Consequently, even when the plurality of light emitting elements are controlled to be turned on sequentially one by one, the surface of the fluorescent substance resin layer having an increased area can be uniformly illuminated with light, thereby resulting in uniform luminance of light from the fluorescent substance resin layer.

In the light emitting module of Japanese Patent Application Laid-Open No. 2014-146750, the luminance of light from the surface of the fluorescent substance resin layer is made uniform, and therefore, the light emitting module cannot be used as a lighting unit for projecting light with a predetermined low beam or high beam light distribution including a cutoff line for preventing generation of glare light with respect to a driver of a preceding vehicle running in front of a vehicle having the lighting unit installed thereon.

Furthermore, some vehicle headlamp apparatuses, such as those disclosed in Japanese Patent Application Laid-Open Nos. 2009-184642, 2009-218155 (or US2009/0231866A1 corresponding this Japanese publication), 2013-054993 (or EP2567867A2 corresponding this Japanese publication), can form a light distribution pattern by irradiation of light from a plurality of light sources for a headlamp provided in a vehicle. The light distribution pattern is varied corresponding to the position of an oncoming vehicle or pedestrian existing in front of the vehicle with time.

However, each of the light sources cannot form a main light distribution pattern but they can form an additional light distribution pattern together.

SUMMARY

The presently disclosed subject matter was devised in view of these and other problems and features in association with the conventional art. According to an aspect of the presently disclosed subject matter, a vehicle headlight can ensure a driver's visibility even when the headlight projects low-beam/high-beam light or light serving as a fog lamp required to form a predetermined light distribution for preventing generation of glare light with respect to a driver of a preceding vehicle running in front of a vehicle, and at the same time, can promote awareness of pedestrians and the like in front of and around the vehicle.

According to another aspect of the presently disclosed subject matter, a vehicle headlight installed in a vehicle can include a plurality of lamp modules each configured to project light in front of the vehicle, and a control unit configured to control the plurality of lamp modules to be turned on and off so that a lighting pattern constituted by the lamp module or lamp modules being turned on is varied and at least one lamp module out of the plurality of lamp modules is configured to form a predetermined light distribution for ensuring a driver's visibility when being turned on.

With the aforementioned configuration, even when the lighting pattern constituted by the lamp module or lamp modules being turned on is varied, the control unit can control the lamp modules to emit light with a predetermined light distribution for ensuring a driver's visibility. Accordingly, the vehicle headlight can ensure a driver's visibility even when the headlight projects low-beam/high-beam light or light serving as a fog lamp required to form a predetermined light distribution for preventing generation of glare light with respect to a driver of a preceding vehicle.

Furthermore, in addition to the ensured driver's visibility as well as the enablement of the formation of a predetermined light distribution, the vehicle headlight can promote awareness of pedestrians and the like in front of and around the vehicle by the varied lighting pattern by the turned-on lamp modules controlled by the control unit.

Furthermore, since the vehicle headlight can include the plurality of lamp modules, a plurality of lighting patterns for providing predetermined light distributions can be provided. Therefore, even if any lamp module out of the plurality of lamp modules is failed, the remaining lamp modules can be controlled to form a desired predetermined light distribution.

Incidentally, the plurality of lamp modules can include a lamp module for projecting low-beam light (passing-by light) and a lamp module for projecting high-beam light (running light), and they form respective predetermined light distributions for ensuring a driver's visibility.

According to another aspect of the presently disclosed subject matter, the vehicle headlight according to the previous aspect can be configured such that the lighting pattern can be varied in accordance with a running speed of the vehicle.

The vehicle headlight with this configuration in which the lighting pattern is varied in accordance with the running speed of the vehicle can promote awareness of pedestrians and the like in front of and around the vehicle, thereby increasing the safety of pedestrians and the like.

According to another aspect of the presently disclosed subject matter, the vehicle headlight according to any one of the previous aspects can be configured such that the lamp module can include a light source, an optical member configured to control the light distribution of the light from the light source, and a light guiding member configured to guide the light from the light source to the optical member so that the light source and the optical member are separately disposed from each other.

With this configuration allowing the light source and the optical member to be separately disposed from each other, the degree of freedom for disposing any member within the lamp module in which the installable space for an optical member is limited can be made larger, resulting in increased degree of freedom in designing of the lamp module.

According to another aspect of the presently disclosed subject matter, the vehicle headlight according to any of the previous aspects can be configured such that the control unit can perform control to provide a first lighting pattern configured by turning on all the plurality of lamp modules as the lighting pattern when the running speed of the vehicle is less than a predetermined speed threshold, and to provide a second lighting pattern or a third lighting pattern as the lighting pattern when the running speed of the vehicle is equal to or higher than the predetermined speed threshold, the second lighting pattern is configured by varying the number of the lamp modules to be turned on in accordance with an elapsed time since the vehicle headlight was turned on, and the third lighting pattern is configured by selecting the lamp modules to be turned on to thereby vary the position(s) of the lamp module(s) to be turned on.

With this configuration, when the vehicle travels in a high speed state at a running speed equal to or higher than a predetermined speed threshold, the vehicle headlight can control the lighting pattern varied in accordance with the elapsed time since the vehicle headlight was turned on. As a result, the vehicle headlight can promote awareness of pedestrians and the like in front of and around the vehicle, thereby increasing the safety of pedestrians and the like.

Furthermore, when the vehicle travels in a low speed state at a running speed lower than the predetermined speed threshold or the vehicle stops, the vehicle headlight can control the lighting pattern to turn on all the lamp module while a predetermined light distribution is formed. If such a lighting control is not achieved, the lamp module may be excessively heated by heat generated by the light source. However, the vehicle headlight can reduce the heat amount generated by the respective light sources to suppress the too-highly heated state by the light source, resulting in extended life of the light sources.

In the vehicle headlight according to any one of the aforementioned aspects, the light source can be configured by a semiconductor laser light source. The use of the semiconductor laser light source can miniaturize the associated optical member for controlling the light distribution pattern of light from the laser light source. Furthermore, the degree of freedom for disposing any member within the lamp module in which the installable space for an optical member is limited can be made larger, resulting in increased degree of freedom in design of the lamp module.

According to another aspect of the presently disclosed subject matter, the vehicle headlight according to any one of the previous aspects can be configured such that the plurality of lamp modules can be configured to include a lamp module configured to project a low beam and a lamp module configured to project a high beam.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle headlights of the presently disclosed subject matter first with reference to FIGS. 1A to 3 in accordance with exemplary embodiments.

FIG. 1A is a schematic front view of a vehicle body (automobile) where a vehicle headlight 1 made in accordance with principles of the presently disclosed subject matter is installed, and FIG. 1B is a schematic front view illustrating the vehicle headlight 1 in which lamp modules are arranged.

As illustrated in FIG. 1A, the vehicle can include vehicle headlights 1a and 1b on both right and left sides in a front portion of a vehicle body C. Hereinafter, the vehicle headlights 1a and 1b may be collectively referred to as simply "vehicle headlight 1" as appropriate.

The vehicle headlight 1, as illustrated in FIG. 1B, can includes a high-beam lamp module 2 constituted by two lamp modules configured to form a high beam light distribution, a low-beam lamp module 3 constituted by six lamp modules configured to form a low beam light distribution, and a not-illustrated fog-lamp module.

The number of the lamp modules can be determined in consideration of the intended use purpose, installation space, and other factors. In the present exemplary embodiment, the number of the lamp modules constituting the high-beam lamp module 2 is set to two due to the use frequency of the high-beam lamp module 2 as compared with the low-beam lamp module 3, but may be one or three or more in accordance with the required specification.

The low-beam lamp module 3 can be configured to include three spot-light lamp modules S1, S2, and S3 configured to irradiate a predetermined position with high-intensity light to thereby form a spot-light type light distribution for a vehicle headlight, and three middle-type lamp modules M1, M2, and M3 configured to form a passing-by (low-beam) light distribution for a vehicle headlight having a predetermined horizontal cutoff line and a predetermined inclined cutoff line for preventing generation of glare light with respect to a driver of a preceding vehicle. Here, the three spot-light lamp modules S1, S2, and S3 and the three middle-type lamp modules M1, M2, and M3 can be arranged in line while being alternately arranged from each other.

Note that the "predetermined light distribution (pattern)" used herein means a light distribution (pattern) formed by the light distributed by the low-beam lamp module 3, specifically, formed by the spot-light type light distributions and satisfying predetermined requirements for light distribution to be discussed later.

The number of the lamp modules can be determined in consideration of the intended use purpose, installation space, and other factors. In the present exemplary embodiment, the number of the lamp modules constituting the low-beam lamp module 3 is set to three for each of the spot-light lamp modules and middle-type lamp modules, but may be two or four or more in accordance with the required specification. Furthermore, the low-beam lamp module 3 may be configured to include a wide-type lamp module(s) configured to form a running (high-beam) light distribution of a vehicle headlight toward a front farther area.

The light distribution requirements for the high-beam lamp module 2, the low-beam lamp module 3, and the fog lamp can be different from those for DRLs, turn signal lamps, stop lamps, etc., from the viewpoint of the driver's visibility to be ensured.

For example, DRL can form a light distribution having a center light intensity of 400 to 1,200 cd. On the contrary, the high-beam lamp module 2 can form a light distribution having a center light intensity of 40,500 cd or higher, the low-beam lamp module 3 can form a light distribution having a minimum light intensity of 10,100 cd or higher, and the fog lamp can form a light distribution having a minimum light intensity of 1,700 cd or higher, each light distribution having a cutoff line for the purpose of preventing generation of glare light with respect to a driver of a preceding vehicle. Note that the vehicle headlight 1 as a whole can be configured to provide a maximum light intensity of 215,000 cd.

Figure 1:
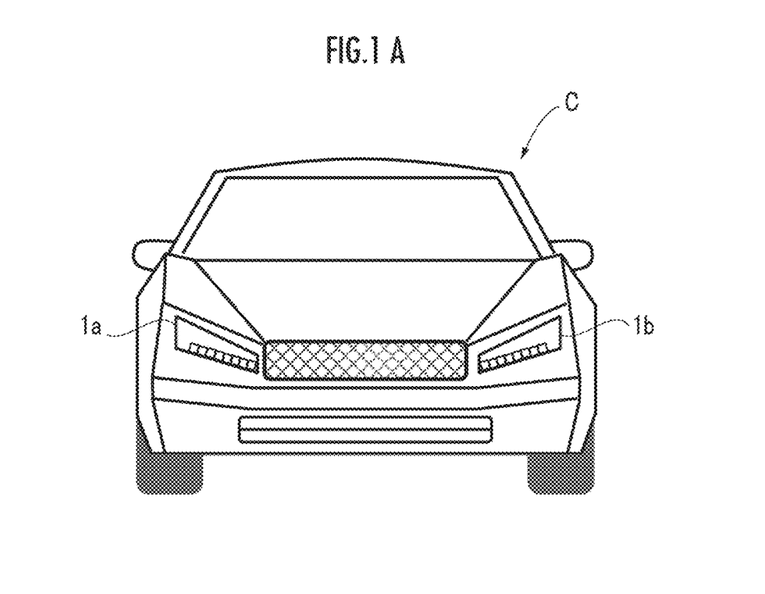
FIG. 1A is a front view of a vehicle body where a vehicle headlight 1 made in accordance with principles of the presently disclosed subject matter is installed.
FIG. 1B is a schematic front view illustrating the vehicle headlight 1.
Figure 2:
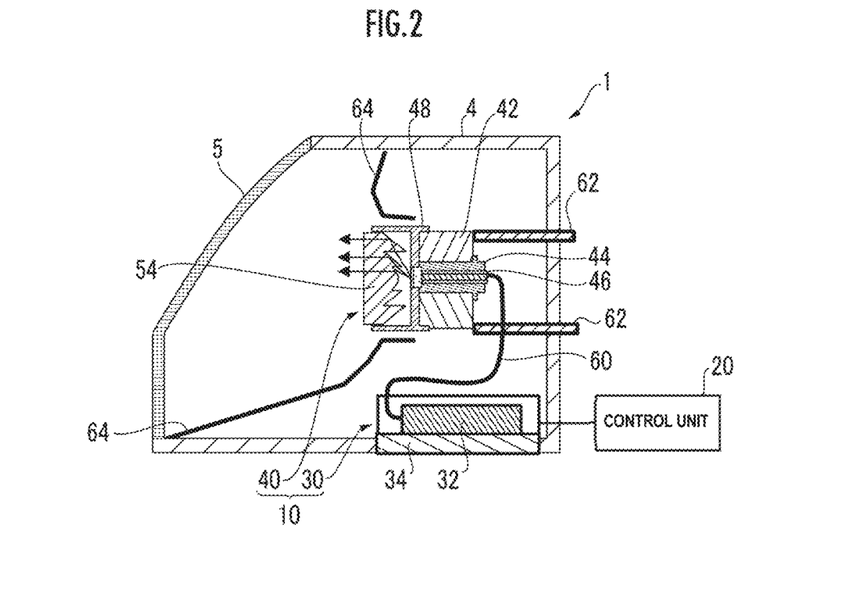
FIG. 2 is a schematic partial cross-sectional view of a lamp module constituting the vehicle headlight.
Figure 3:
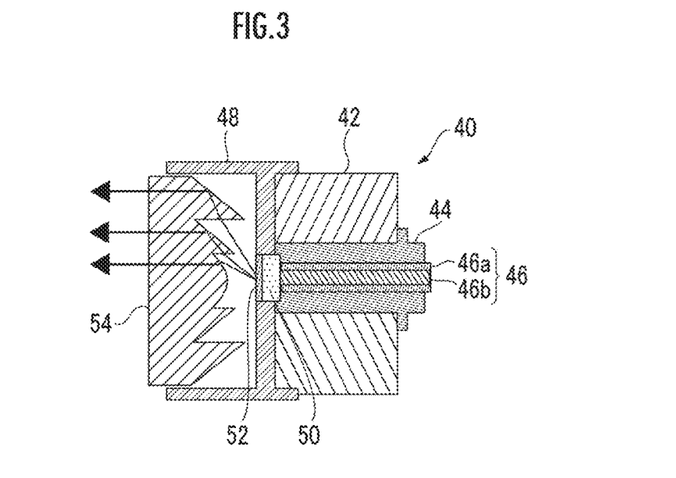
FIG. 3 is an enlarged cross-sectional view of the lamp module having an optical member.
Figure 4:
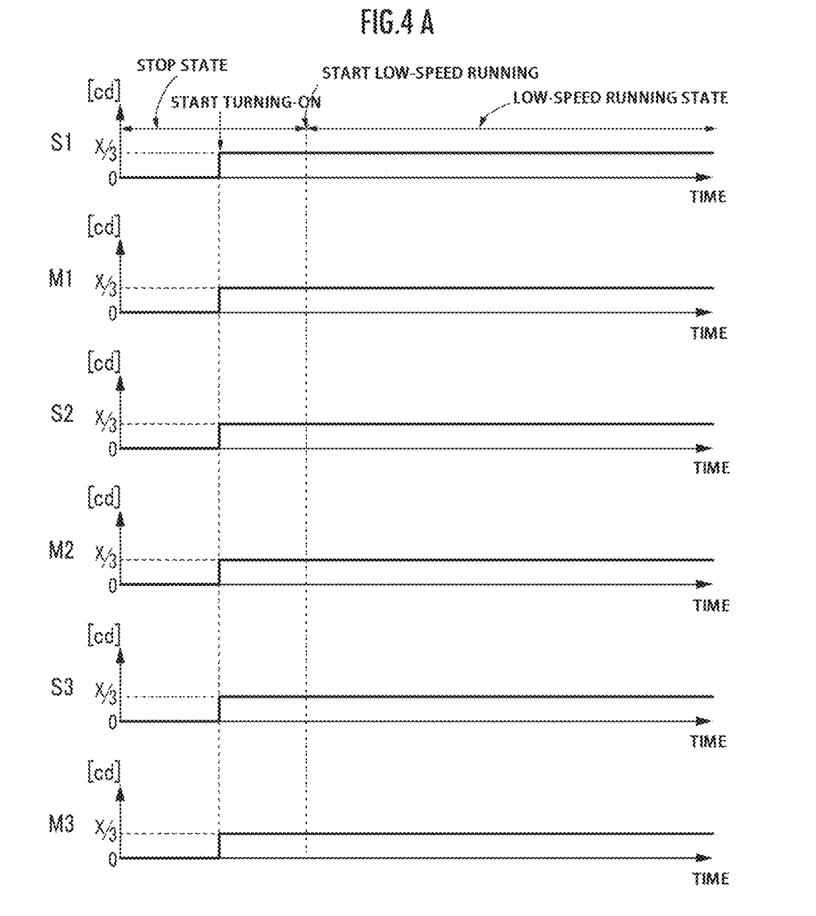
FIG. 4A shows how to control respective lamp modules when the vehicle starts running at a low speed from its stopped state.
FIG. 4B is a schematic front view of the vehicle headlight with the associated lamp modules constituting a lighting pattern.
Figure 5:
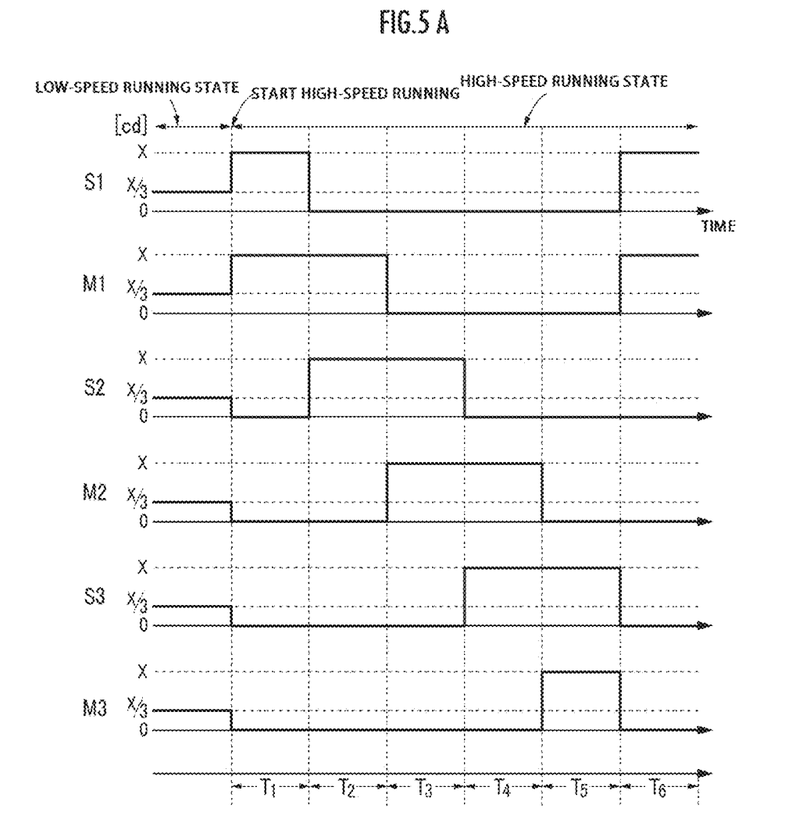
FIG. 5A shows how to control respective lamp modules when the vehicle starts running at a high speed from the low speed.
FIG. 5B shows schematic front views of the vehicle headlight with the associated lamp modules constituting respective lighting patterns.

A description will now be given of the configuration of the lamp module of the present exemplary embodiment with reference to FIGS. 2 and 3, in particular, using the spot-light lamp module S1. FIG. 2 is a schematic partial cross-sectional view of the lamp module S1 taken along line II-II in FIG. 1B, and FIG. 3 is an enlarged cross-sectional view of the lamp module S1 having an optical member.

The vehicle headlight 1 can include a housing 4 having an opening opened toward its front side, an outer lens 5 attached to the opening to cover the same, a plurality of lamp modules 10 (including S1) installed in a lighting chamber defined by the outer lens 5 and the housing 4, and a control unit 20 configured to control the plurality of lamp modules 10 to be turned on and off. The outer lens 5 can be formed from a translucent material (light-transmitting material) such as a polycarbonate resin, but may be a plain material. Furthermore, the outer lens 5 may or may not have a lens function.

The lamp module 10 can be configured to include a light source 30 configured to be connected to the control unit 20, an optical member 40 configured to control the light distribution of the light from the light source 30, and a light guiding member 60 configured to guide the light from the light source 30 to the optical member 40 so that the light source 30 and the optical member 40 are separately disposed from each other. Furthermore, in the vehicle headlight 1 of this exemplary embodiment, the light source 30 can emit blue light, and the blue light can be guided through the light guiding member 60 to the optical member 40. By means of the optical member 40, the blue light can be wavelength-converted and mixed with part of the original blue light to become pseud white light, which is to be projected forward.

The light source 30 can be a semiconductor laser light source, and include a semiconductor light emitting element 32 and a substrate 34 to be fit to the housing at its opening and configured to support the semiconductor light emitting element 32. Examples of the semiconductor light emitting element 32 may include a light emitting diode (LED), and a laser diode (LD). In the present exemplary embodiment, a laser diode is used as the semiconductor light emitting element 32. As compared with an LED, an LD can have superior response with respect to a driving current, and thus, even when lamp modules to be turned on are switched over, a stable and constant light intensity of light provided by the vehicle headlight 1 can be maintained.

The optical member 40 can be configured to include a main body 42, a cylindrical ferrule 44, an optical fiber 46, and a flange 48. The main body 42 can be made of a highly heat conductive material such as metal (e.g., aluminum, copper, etc.) and fixed to the housing 4 by optical axis adjustment mechanisms 62, 62 (which support the entire optical member 40). The main body 42 can have a center opening, and the cylindrical ferrule 44 can be attached to the opening of the main body 42 as illustrated in FIG. 3. The optical fiber 46 can be attached to the ferrule 44 and configured to include a core 46b and a clad 46a surrounding the core 46b. The flange 48 can be secured to the main body 42. Furthermore, the vehicle headlight 1 can include extensions 64, 64 that extend from the housing 4 to support and secure the optical member 40 together with the optical axis adjustment mechanisms 62, 62.

The optical member 40 can further include a diffusion member 50 constituted by a light guiding member fixed to the center portion of the flange 48, a wavelength conversion member 52 disposed on the diffusion member 50 and including a phosphor for wavelength-converting light to have particular wavelengths, and a lens 54 configured to control light distribution, that are arranged in this order along a light path (optical axis). With this configuration, the light emitted from the light source and guided through the optical fiber 46 can be diffused by the diffusion member 50 to irradiate the wavelength conversion member 52 therewith, wavelength-converted to have desired wavelengths, and projected through the lens 54 forward.

The control unit 20 can be connected to each of the lamp modules 10 to control the respective light sources 30 of the lamp modules 10 on the basis of the driving signal transmitted from the control unit 20 to the respective light sources 30 for control. The control unit 20 can be constituted by an electronic control unit (such as an electronic circuit including a CPU, a ROM, a RAM, and an I/O circuit, and an A/D circuit, etc.). For example, the CPU can read various programs including a control program from a memory device and execute various processings described later in accordance with the read programs.

Specifically, the control unit 20 can control the respective lamp modules 10, including the spot-light lamp modules S1, S2, and S3 and the middle-type lamp modules M1, M2, and M3 constituting the low-beam lamp module 3, so as to vary the lighting patterns constituted by the lamp modules that are turned on.

When the control unit 20 controls the turning ON/OFF of the lamp modules 10 in accordance with the lighting patterns, the control should be achieved so that a predetermined light distribution is formed and maintained for ensuring the driver's visibility.

Suppose a case where one of the spot-light lamp modules S1, S2, and S3 is turned on by the control of the control unit 20, and in order to secure the driver's visibility with the irradiated light, the desired predetermined light intensity is X cd. In this case, even when any one of the lighting patterns is employed, the one of the spot-light lamp modules S1, S2, and S3 can be controlled to maintain the desired predetermined light intensity. The same control can be applied to the case of the middle-type lamp modules M1, M2, and M3 to maintain the desired predetermined light intensity.

A description will now be given of the lighting control of the vehicle headlight 1 of the present exemplary embodiment with reference to FIGS. 4A to 6B.

[Lighting Control when the Vehicle is Stopped and Starts Running at a Low Speed]

With reference to FIGS. 4A and 4B, a description will be given of the lighting control of the vehicle headlight 1 when the vehicle is stopped and when the vehicle is running at a running speed lower than a predetermined speed threshold, for example, at a low running speed lower than 40 km/h. FIG. 4A shows how to control respective lamp modules constituting the low-beam lamp module 3 when the vehicle starts running at a low speed from its stopped state. FIG. 4B is a schematic front view of the vehicle headlight 1 with the associated lamp modules of the low-beam lamp module 3 constituting a lighting pattern when the vehicle starts running at a low speed from its stopped state.

When a driver operates the vehicle headlight 1 of the present exemplary embodiment to turn on the low-beam lamp module 3 at the time when the vehicle is stopped and the vehicle starts running at a low speed, as illustrated in FIGS. 4A and 4B, the control unit 20 can control the lamp modules 10 constituting the low-beam lamp module 3, or all the spot-light lamp modules S1, S2, and S3, and the middle-type lamp modules M1, M2, and M3 and corresponding light sources 30 so that they are turned on.

Specifically, as illustrated in FIG. 4A, the control unit 20 can perform control to turn off all the lamp modules S1 to S3 and M1 to M3 at the time when the vehicle is stopped before the driver operates the vehicle headlight 1. Then, the operator operates the vehicle headlight 1, the control unit 20 can perform control to turn on all the lamp modules S1 to S3 and M1 to M3 even at the time when the vehicle is stopped. In this case, the lamp modules S1 to S3 and M1 to M3 can be turned on with an intensity of X/3 cd to form a lighting pattern as illustrated in FIG. 4B by the hatched lamp modules being turned on. Note that FIG. 4A shows the case where the driver operates the vehicle headlight 1 to turn on the low-beam lamp module 3 when the vehicle is stopped, but it is not limitative. The same control can be achieved when the driver operates the vehicle headlight 1 to turn on the low-beam lamp module 3 if the vehicle is running at a low speed.

[Lighting Control when the Vehicle is Running at a High Speed from the Low Speed]

With reference to FIGS. 5A and 5B, a description will be given of the lighting control of the vehicle headlight 1 from when the vehicle is running at a low speed after the vehicle headlight 1 is turned on to when the vehicle is running at a running speed equal to or higher than the predetermined speed threshold, for example, at a high running speed equal to or higher than 40 km/h. FIG. 5A shows how to control respective lamp modules constituting the low-beam lamp module 3 when the vehicle starts running at a high speed from the low speed after the vehicle headlight 1 is turned on. FIG. 5B shows schematic front views of the vehicle headlight with the associated lamp modules of the low-beam lamp module 3 constituting respective lighting patterns when the vehicle starts running at a high speed from the low speed as shown in FIG. 5A.

When a driver operates the vehicle headlight 1 of the present exemplary embodiment at the time when the vehicle starts running at the high speed from the low speed after the vehicle headlight 1 is turned on, as illustrated in FIGS. 5A and 5B, the control unit 20 can control the light sources 30 of the lamp modules 10 so that one lamp module out of the three spot-light lamp modules S1, S2, and S3 and one lamp module that is out of the three middle-type lamp modules M1, M2, and M3 and adjacent to the one spot-light lamp module are turned on. Thus, the lighting pattern can be constituted by the one stop-light lamp module S1, S2, or S3 and the one middle-type lamp module M1, M2, or M3 adjacent thereto.

At that time, the control unit 20 can perform control on the lamp modules 10 to move the lighting pattern formed by the combination of the spot-light and middle-type lamp modules in accordance with the elapsed time. The movement of the lighting pattern can be in a direction from the center side of the vehicle body to the widthwise end side of the vehicle body. In this manner, the control unit 20 can perform lighting control by varying the lighting pattern (moving the position of the lighting pattern).

Furthermore, as illustrated in FIG. 5A, the control unit 20 can perform control to turn on all the lamp modules S1 to S3 and M1 to M3 with the intensity of X/3 cd when the vehicle is running at a low speed after the vehicle headlight 1 is turned on to provide the lighting pattern shown in FIG. 4B.

Then, when the vehicle starts running at the high speed from the low speed, the control unit 20 can perform control to turn on the combination of the spot-light lamp module and the middle-type lamp module adjacent thereto for a unit time $T_i$ (i=1 to 6 in this case) and then change the turned-on combination thereof to the next adjacent combination from the center side to the widthwise end side of the vehicle body, thereby performing the lighting control to vary the lighting pattern (move the lighting pattern).

In particular, as illustrated in FIG. 5B, the control unit 20 can control the lamp modules so that only the lamp modules S1 and M1 are turned on with the intensity of X cd for the unit time $T_1$ during which the vehicle starts running at the high speed from the low speed. Then, the control unit 20 can control the lamp modules so that only the lamp modules M1 and S2 are turned on with the intensity of X cd for the unit time $T_2$, only the lamp modules S2 and M2 are turned on with the intensity of X cd for the unit time $T_3$, only the lamp modules M2 and S3 are turned on with the intensity of X cd for the unit time $T_4$, and only the lamp modules S3 and M3 are turned on with the intensity of X cd for the unit time $T_5$, sequentially. Then, the control unit 20 can control the lamp modules so that only the lamp modules S1 and M1 are turned on again with the intensity of X cd for the unit time $T_6$, and further repeatedly control the lamp modules in the same manner during the high speed running state. As a result, by varying the lighting pattern in accordance with the running speed of the vehicle, the vehicle headlight can promote awareness of pedestrians and the like in front of and around the vehicle, thereby increasing the safety of pedestrians and the like.

The control unit 20 that can vary the lighting pattern constituted by the lamp modules in accordance with the vehicle running speed can perform control not only in the manner shown in FIGS. 5A and 5B but also in various manners.

Figure 6A:
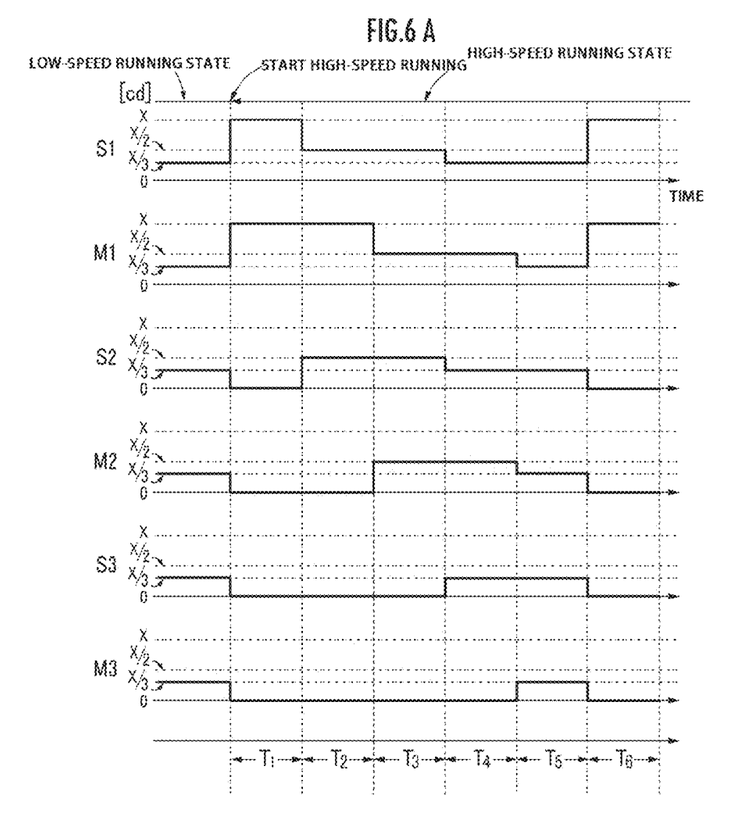
FIG. 6A shows how to control respective lamp modules when the vehicle starts running at a high speed from the low speed.
Figure 6B:
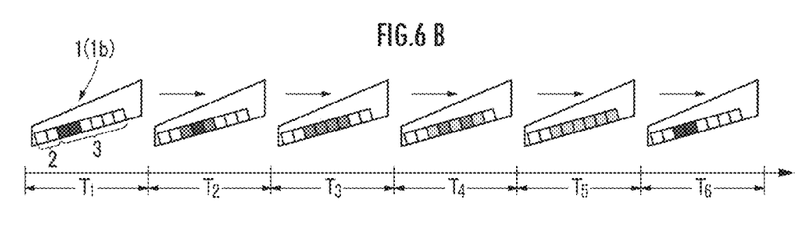
FIG. 6B shows schematic front views of the vehicle headlight with the associated lamp modules constituting respective lighting patterns.

FIGS. 6A and 6B show another exemplary lighting control. FIG. 6A shows how to control respective lamp modules constituting the low-beam lamp module 3 when the vehicle starts running at a high speed from the low speed after the vehicle headlight 1 is turned on. FIG. 6B shows schematic front views of the vehicle headlight with the associated lamp modules of the low-beam lamp module 3 constituting respective lighting patterns when the vehicle starts running at a high speed from the low speed as shown in FIG. 6A.

When a driver operates the vehicle headlight 1 of the present exemplary embodiment at the time when the vehicle starts running at the high speed from the low speed after the vehicle headlight 1 is turned on, as illustrated in FIGS. 5A and 5B, the control unit 20 can control the light sources 30 of the lamp modules 10 so that at least one lamp module out of the three spot-light lamp modules S1, S2, and S3 and at least one lamp module that is out of the three middle-type lamp modules M1, M2, and M3 and adjacent to the at least one spot-light lamp module are turned on. Thus, the lighting pattern can be constituted by the at least one stop-light lamp module S1, S2, or S3 and the at least one middle-type lamp module M1, M2, or M3 adjacent to the turned-on spot-light lamp module.

At that time, the control unit 20 can perform control on the lamp modules 10 to vary the lighting pattern formed by the combination of the spot-light and middle-type lamp modules in accordance with the elapsed time. Specifically, the control unit 20 can perform control on the lamp modules 10 to widen the lighting pattern of the combination of the at least one spot-light lamp module and the at least one middle-type lamp module adjacent thereto from the center side of the vehicle body to the widthwise end side of the vehicle body.

Furthermore, as illustrated in FIG. 6A, the control unit 20 can perform control to turn on all the lamp modules S1 to S3 and M1 to M3 with the intensity of X/3 cd when the vehicle is running at a low speed after the vehicle headlight 1 is turned on to provide the lighting pattern shown in FIG. 4B.

Then, when the vehicle starts running at the high speed from the low speed, the control unit 20 can perform control to turn on the combination of the spot-light lamp module and the middle-type lamp module adjacent thereto for a unit time Ti (i=1 to 6 in this case) and then change the turned-on combination thereof to widen the lighting pattern from the center side to the widthwise end side of the vehicle body, thereby performing the lighting control to vary the lighting pattern (widen the lighting pattern).

In particular, as illustrated in FIG. 6B, the control unit 20 can control the lamp modules so that only the lamp modules S1 and M1 are turned on with the intensity of X cd for the unit time $T_1$ during which the vehicle starts running at the high speed from the low speed. Then, the control unit 20 can control the lamp modules so that only the lamp modules S1 and S2 are turned on with the intensity of X/2 cd and the lamp module M1 is turned on with the intensity of X cd for the unit time $T_2$.

Then, the control unit 20 can control the lamp modules so that only the lamp modules S1 and S2 and M1 and M2 are turned on with the intensity of X/2 cd for the unit time $T_3$, and only the lamp modules S1 to S3 are turned on with the intensity of X/3 cd and the lamp modules M1 and M2 are turned on with the intensity of X/2 cd for the unit time $T_2$.

Next, the control unit 20 can control the lamp modules so that only the lamp modules S1 to S3 and M1 to M3 are turned on with the intensity of X/3 cd for the unit time $T_5$. Then, the control unit 20 can control the lamp modules so that only the lamp modules S1 and M1 are turned on again with the intensity of X cd for the unit time $T_6$, and further repeatedly control the lamp modules in the same manner during the high speed running state. As a result, by varying the lighting pattern in accordance with the running speed of the vehicle, the vehicle headlight can promote awareness of pedestrians and the like in front of and around the vehicle, thereby increasing the safety of pedestrians and the like.

Figure 7:
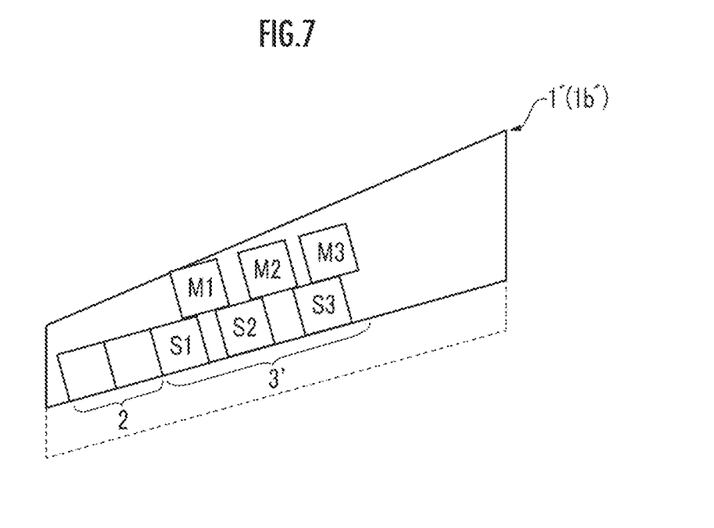
FIG. 7 is a schematic front view illustrating a vehicle headlight with lamp modules arranged in a different manner.

Incidentally, the mode of arrangement of the high-beam lamp module 2 and the low-beam lamp module 3 in the vehicle headlight 1 is not limited to that shown in FIG. 1B, but can take various arrangements providing spaces between respective lamp modules. For example, as illustrated in FIG. 7, the spot-light lamp modules S1 to S3 may be disposed separately from each other on the lower side while the middle-type lamp modules M1 to M3 may be disposed separately from each other on the upper side.

When the wavelength conversion member 52 wavelength-converts light to light having desired wavelengths, heat can be generated to deteriorate the wavelength conversion efficiency in the optical member 40. The vehicle headlight 1 illustrated in FIG. 7 can be configured such that the spot-light lamp modules S1 to S3 are disposed separately from each other on the lower side while the middle-type lamp modules M1 to M3 are disposed separately from each other on the upper side, thereby facilitating the heat dissipation to prevent the deterioration of the wavelength conversion efficiency.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle headlight installed in a vehicle, comprising:
a plurality of lamp modules each configured to project light in front of the vehicle; and
a control unit configured to control the plurality of lamp modules to be turned on and off so that a lighting pattern constituted by the lamp module or lamp modules being turned on is varied, wherein at least one lamp module out of the plurality of lamp modules is configured to form a predetermined light distribution for ensuring a driver's visibility when being turned on, wherein
the plurality of lamp modules comprise at least a plurality of spot-light lamp modules and a plurality of cutoff line forming lamp modules,
the plurality of spot-light lamp modules comprise at least a first spot-light lamp module and a second spot-light lamp module, each module being configured to form a spot-light type light distribution narrower than a light distribution formed by the cut-off line forming lamp module,
the plurality of cutoff line forming lamp modules comprise at least a first cutoff line forming lamp module and a second cutoff line forming lamp module, each module being configured to form any one of a light distribution having a horizontal cutoff line and a light distribution pattern having an inclined cutoff line
at least the first spot-light lamp module and the first cutoff line forming lamp module constitute a first group, at least the second spot-light lamp module and the second cutoff line forming lamp module constitute a second group, and the first group and the second group are arranged adjacent to each other, the control unit is configured for turning on and off the plurality of lamp modules, the control unit is configured to control as a lighting pattern to turn on all the lamp modules contained in the first group first, and then to turn off, or reduce a light intensity of, either the first cutoff line forming lamp module or the first spot-light lamp module in the first group which is positioned opposite to a side closer to the second group, and in synchronization therewith turn on either the second cutoff line forming lamp module or the second spot-light lamp module in the second group which is positioned on a side closer to the first group.

2. The vehicle headlight according to claim 1, wherein the lighting pattern is varied in accordance with a running speed of the vehicle.

3. The vehicle headlight according to claim 2, wherein the lamp module includes a light source, an optical member configured to control a light distribution of the light from the light source, and a light guiding member configured to guide the light from the light source to the optical member so that the light source and the optical member are separately disposed from each other.

4. The vehicle headlight according to claim 3, wherein the light source is configured by a semiconductor laser light source.

5. The vehicle headlight according to claim 4, wherein the plurality of lamp modules are configured to include a lamp module configured to project a low beam and a lamp module configured to project a high beam.

6. The vehicle headlight according to claim 2, wherein the plurality of lamp modules are configured to include a lamp module configured to project a low beam and a lamp module configured to project a high beam.

7. The vehicle headlight according to claim 3, wherein the plurality of lamp modules are configured to include a lamp module configured to project a low beam and a lamp module configured to project a high beam.

8. The vehicle headlight according to claim 1, wherein the lamp module includes
   a light source,
   an optical member configured to control a light distribution of the light from the light source, and
   a light guiding member configured to guide the light from the light source to the optical member so that the light source and the optical member are separately disposed from each other.

9. The vehicle headlight according to claim 8, wherein the light source is configured by a semiconductor laser light source.

10. The vehicle headlight according to claim 9, wherein the plurality of lamp modules are configured to include a lamp module configured to project a low beam and a lamp module configured to project a high beam.

11. The vehicle headlight according to claim 8, wherein the plurality of lamp modules are configured to include a lamp module configured to project a low beam and a lamp module configured to project a high beam.

12. The vehicle headlight according to claim 1, wherein the plurality of lamp modules are configured to include a lamp module configured to project a low beam and a lamp module configured to project a high beam.

13. The vehicle headlight according to claim 1, wherein the plurality of lamp modules further comprise another group constituted by a spot-light lamp module and a cutoff line forming lamp module.

14. The vehicle headlight according to claim 1, wherein the control unit is configured to change the lighting pattern such that a combination of a turned-on spot-light lamp module and cutline forming lamp module which are adjacent to each other and constitute the lighting pattern is moved in position in accordance with elapsed time.

15. The vehicle headlight according to claim 1, wherein the plurality of lamp modules comprise a wide-type lamp module configured to form a running light distribution toward a front farther area.

16. A vehicle headlight installed in a vehicle, comprising:
   a plurality of lamp modules each configured to project light in front of the vehicle; and
   a control unit configured to control the plurality of lamp modules to be turned on and off so that a lighting pattern constituted by the lamp module or lamp modules being turned on is varied, wherein at least one lamp module out of the plurality of lamp modules is configured to form a predetermined light distribution for ensuring a driver's visibility when being turned on, wherein
   the lighting pattern is varied in accordance with a running speed of the vehicle, wherein
   the control unit performs control
      to provide a first lighting pattern configured by turning on all the plurality of lamp modules as the lighting pattern when the running speed of the vehicle is less than a predetermined speed threshold, and
      to provide a second lighting pattern or a third lighting pattern as the lighting pattern when the running speed of the vehicle is equal to or higher than the predetermined speed threshold, the second lighting pattern being configured by varying the number of the lamp modules to be turned on in accordance with an elapsed time since the vehicle headlight was turned on, and the third lighting pattern being configured by selecting the lamp modules to be turned on to thereby vary the position(s) of the lamp module (s) to be turned on.

17. The vehicle headlight according to claim 16, wherein the plurality of lamp modules are configured to include a lamp module configured to project a low beam and a lamp module configured to project a high beam.

18. The vehicle headlight according to claim 16, wherein the lamp module includes a light source, an optical member configured to control a light distribution of the light from the light source, and a light guiding member configured to guide the light from the light source to the optical member so that the light source and the optical member are separately disposed from each other.

19. The vehicle headlight according to claim 16, wherein the first lighting pattern is formed with a reduced intensity more than an intensity with which the second lighting pattern or the third lighting pattern is formed.

20. The vehicle headlight according to claim 16, wherein, after the vehicle headlight is turned on and when the vehicle is still stopped, the lamp modules are turned on with a reduced intensity more than an intensity with which the second lighting pattern or the third lighting pattern is formed.

* * * * *